(12) United States Patent
Cowan et al.

(10) Patent No.: US 7,377,099 B2
(45) Date of Patent: May 27, 2008

(54) SYSTEM AND METHOD FOR COOLING LATERAL EDGE REGIONS OF A DIVERGENT SEAL OF AN AXISYMMETRIC NOZZLE

(75) Inventors: Curtis C. Cowan, East Hampton, CT (US); Stephen A. Paul, Andover, CT (US); Meggan Harris, Colchester, CT (US); Paul Attridge, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 442 days.

(21) Appl. No.: 11/140,667

(22) Filed: May 27, 2005

(65) Prior Publication Data

US 2006/0266016 A1    Nov. 30, 2006

(51) Int. Cl.
*F02K 11/00* (2006.01)

(52) U.S. Cl. .................. 60/230; 60/771; 60/266; 239/127.3; 239/265.17; 239/265.39

(58) Field of Classification Search ............... 60/230, 60/232, 771, 266; 239/127.3, 265.17, 265.35, 239/265.39
See application file for complete search history.

(56) References Cited

U.S. PATENT DOCUMENTS

| | | | |
|---|---|---|---|
| 2,989,845 A * | 6/1961 | Howald ................ 239/265.41 |
| 4,081,137 A * | 3/1978 | Sutton et al. ............ 239/127.3 |
| 4,544,098 A | 10/1985 | Warburton |
| 4,662,566 A | 5/1987 | Honeycutt, Jr. |
| 5,082,182 A | 1/1992 | Bruchez, Jr. et al. |
| 5,141,154 A | 8/1992 | Barcza |
| 5,215,257 A | 6/1993 | Barcza |
| 5,232,158 A | 8/1993 | Barcza |
| 5,238,189 A | 8/1993 | Barcza |
| 5,261,605 A | 11/1993 | McLafferty et al. |
| 5,285,637 A | 2/1994 | Barcza |
| 5,364,029 A | 11/1994 | Barcza |
| 5,511,376 A | 4/1996 | Barcza |
| 5,720,434 A * | 2/1998 | Vdoviak et al. ......... 239/127.1 |
| 6,779,336 B2 * | 8/2004 | Allore et al. ................ 60/232 |
| 6,993,914 B2 * | 2/2006 | Prouteau et al. ............. 60/771 |
| 7,032,835 B2 * | 4/2006 | Murphy et al. ............ 239/128 |

* cited by examiner

*Primary Examiner*—Ted Kim

(57) ABSTRACT

An axisymmetric nozzle for a gas turbine engine has divergent flaps and seals disposed about a central longitudinal axis thereof. The divergent flaps and seals each have an inner surface defining cooling air inlet holes at an upstream portion, cooling air exit holes at a downstream portion, and cooling air channels disposed within the divergent flap and seal, and communicating at a first end with the inlet holes and at a second end with the exit holes for conducting cooling air therethrough. Some of the exit holes of the divergent flap are disposed along lateral edge regions thereof. The divergent seals are interposed between adjacent divergent flaps, and each include lateral edge regions extending laterally beyond the exit holes. The lateral edge regions of each divergent seal have an outer surface overlying at least a portion of the exit holes of an adjacent divergent flap.

7 Claims, 4 Drawing Sheets

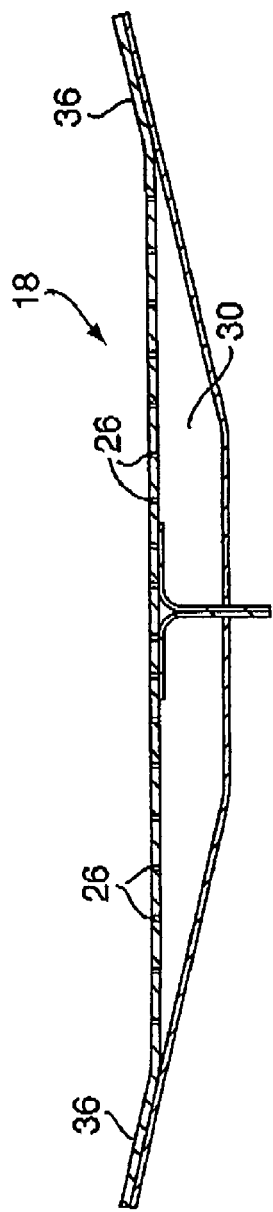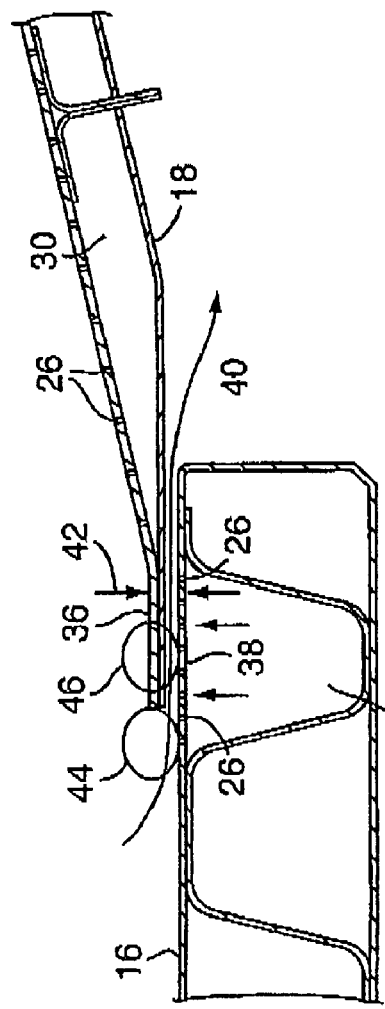

SYSTEM AND METHOD FOR COOLING LATERAL EDGE REGIONS OF A DIVERGENT SEAL OF AN AXISYMMETRIC NOZZLE

FIELD OF THE INVENTION

This invention relates generally to exhaust nozzles for gas turbine engines, and more particularly to a system and method for cooling lateral edge regions of divergent seals of exhaust nozzles.

BACKGROUND OF THE INVENTION

Gas turbine engines for aircraft achieve thrust by discharging hot gases through the exhaust nozzle. Efficient operation for multi-mission application dictates the use of variable area convergent/divergent nozzles. Variable convergent/divergent configuration is achieved in axisymmetric nozzles by the use of a plurality of circumferentially arranged flaps. Overlapping seals are located between adjacent flaps. The hinge arrangement must be provided between each convergent flap or seal and each divergent flap or seal. Variations may be made during operation, of the throat and terminal discharge openings.

Specifically, such variable geometry exhaust ducts for aircraft gas turbine engines frequently use axisymmetric arrangement of adjacent flaps to define the periphery of the exhaust duct. Overlapping seal members operate to seal between the adjacent flaps. An intermediate transverse hinge in the flap and seal members between a convergent section and a divergent section provides the desired convergent/divergent arrangement. The duct may accordingly be configured to define a variable throat area and variable exit area which is necessary for optimum engine performance, particularly in high speed aircraft installations using after burning for thrust augmentation.

The convergent/divergent flaps guide the engine exhaust. It is usual to also supply exterior flaps on a one-to-one basis with the divergent flaps, located outboard of the nozzle surrounding the nozzle. This protects the internal mechanism of the nozzle and provides a smoother appearance. It also provides a proper aerodynamic exterior avoiding cracks or openings which could induce flow perturbations.

Maximum thrust and operating efficiency of a gas turbine engine is achieved when the engine exhaust passes through the exhaust nozzle which controls the expansion of the exhaust gases. Maximum operating efficiency generally requires that the nozzle be configured to exit the exhaust stream at substantially the same pressure as the surrounding ambient atmosphere.

With aircraft operating both at subsonic and supersonic speed the exhaust nozzle pressure ratio varies over a wide range. Variable throat convergent/divergent nozzles are used to achieve proper operation for the various operating conditions.

In the divergent section, gas turbine engine nozzles incorporate a plurality of circumferentially arranged divergent flaps. Each of the divergent flaps has a "gas side", the surface of the divergent flap exposed to the exhaust gas of the engine, and an "air side", the surface of the divergent flap opposite to the gas side. Divergent seals are located between, and overlap, adjacent divergent flaps to prevent the escape of the exhaust gas through the gaps between the divergent flaps.

Such gas turbine engine nozzles operate with gas at an extremely high temperature level such that cooling of the nozzle surfaces is required. A known method includes passing a forced flow of cooling air through a liner which is lining both the convergent flaps and the convergent seals. This cooling flow is then dumped at the throat adjacent to the surface of the divergent section to film cool that section. Unfortunately, the cooling flow does not generally cool the lateral edge regions of divergent seals in a conventional axisymmetric nozzle configuration.

Accordingly, it is an object of the present invention to provide a nozzle configuration that overcomes the above-mentioned drawbacks and disadvantages.

SUMMARY OF THE INVENTION

In an aspect of the present invention, a system for cooling lateral edge regions of an exhaust nozzle divergent seal for a gas turbine engine includes an axisymmetric nozzle having a plurality of divergent flaps disposed about a central longitudinal axis of the nozzle. The divergent flaps each have an inner surface defining a plurality of cooling air inlet holes at an upstream portion, a plurality of cooling air exit holes at a downstream portion, and a plurality of cooling air channels disposed within the divergent flap and communicating at a first end with the inlet holes of the divergent flap and at a second end with the exit holes of the divergent flap for conducting cooling air therethrough. At least a portion of the exit holes of the divergent flap are disposed along lateral edge regions of the divergent flap. A plurality of divergent seals are disposed about the central longitudinal axis. The plurality of divergent seals are interposed between adjacent divergent flaps. The divergent seals each have an inner surface defining a plurality of cooling air inlet holes at an upstream portion, a plurality of cooling air exit holes at a downstream portion, and a plurality of cooling air channels disposed within the divergent seal and communicating at a first end with the inlet holes of the divergent seal and at a second end with the exit holes of the divergent seal for conducting cooling air therethrough. The plurality of divergent seals each include lateral edge regions extending laterally beyond the exit holes of the divergent seal. The lateral edge regions of each divergent seal have an outer surface being in overlying relationship with at least a portion of the exit holes defined in an associated adjacent divergent flap.

BRIEF DESCRIPTION OF THE DRAWINGS

FIG. 4 is a cross-sectional elevation view of the divergent seal taken along the line 4-4 in FIG. 3.

FIG. 5 is a cross-sectional elevation view of the divergent seal and a divergent flap taken along the line 5-5 in FIG. 3.

DETAILED DESCRIPTION OF THE PREFERRED EMBODIMENT

Figure 1:
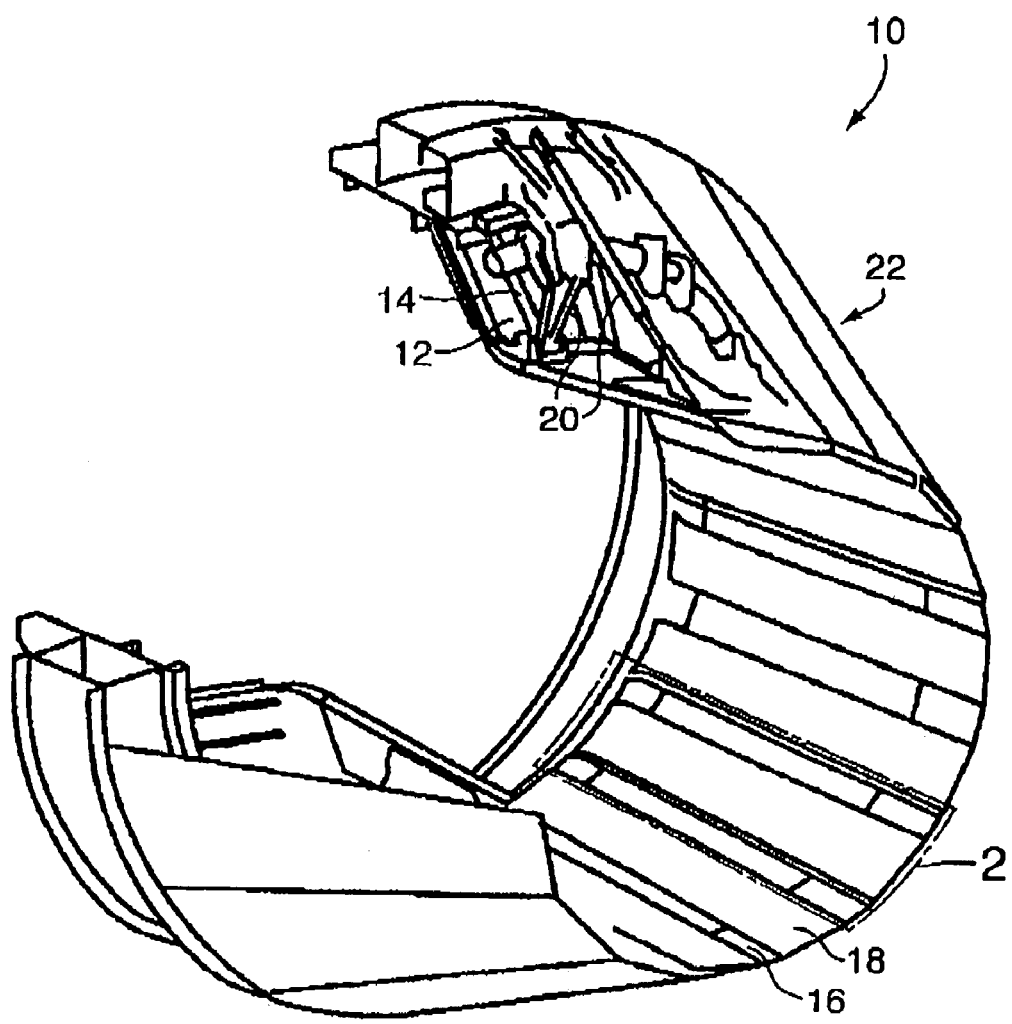
FIG. 1 is a partially broken-away view of an axisymmetric nozzle of a gas turbine engine.

Referring to FIG. 1, an axisymmetric nozzle of a gas turbine engine is indicated generally by the reference number 10. The nozzle 10 comprises a plurality of convergent flaps 12 and convergent seals 14 disposed about a central longitudinal axis of the nozzle. The nozzle 10 further comprises a plurality of divergent flaps 16 and divergent seals 18 disposed about the central longitudinal axis. The convergent flaps 12 and the divergent flaps 16 are movably adjusted by actuation linkages 20 interiorly disposed within the nozzle 10. The nozzle 10 includes a plurality of external flaps 22 on a one-to-one basis with the divergent flaps 16, located outboard of and surrounding the nozzle 10. The external flaps 22 protect the internal mechanism of the nozzle 10 and provide a smoother appearance. The external flaps 22 also provide a proper aerodynamic exterior so as to avoid cracks or openings which could induce flow perturbations.

Figure 2:
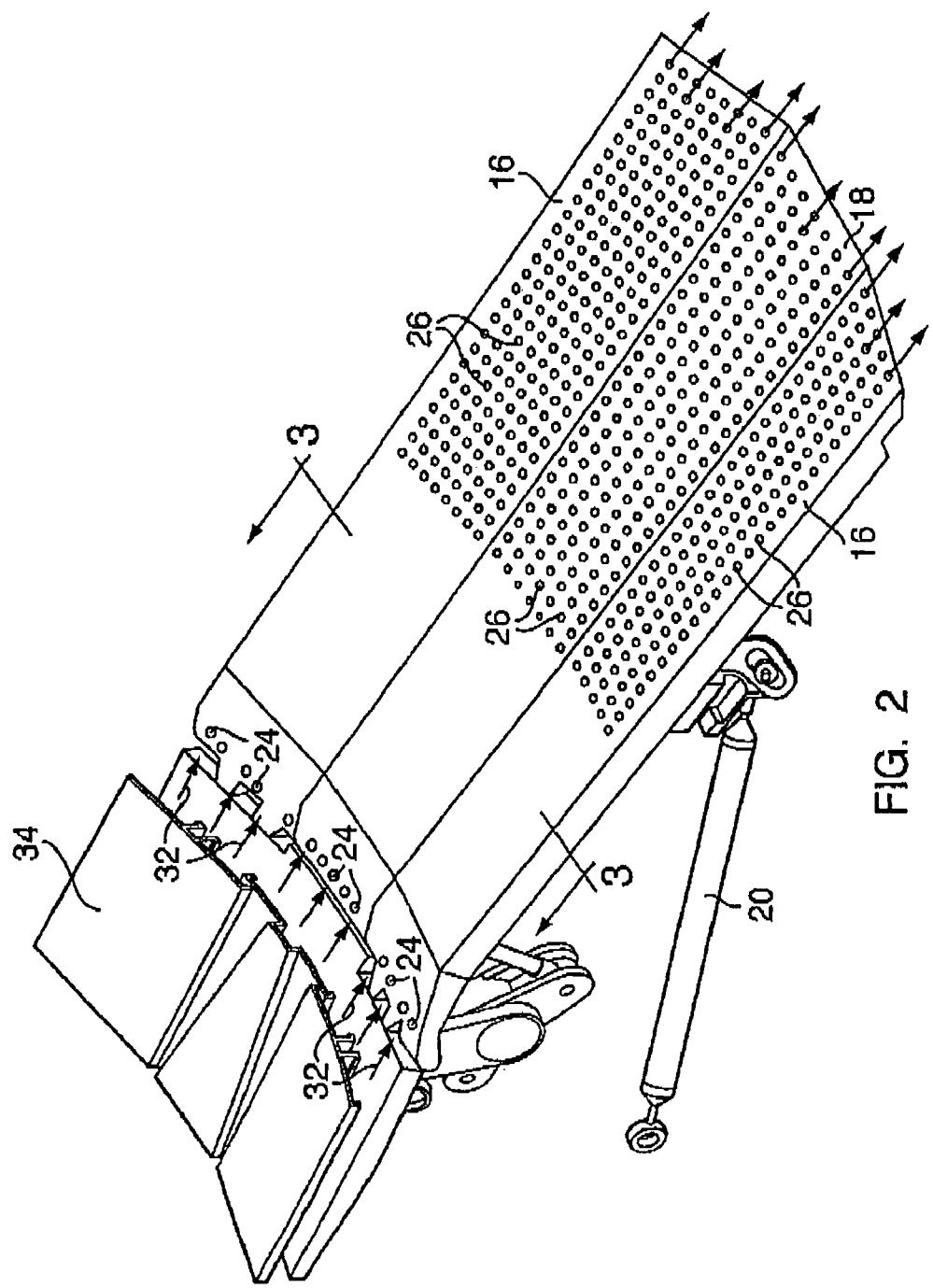
FIG. 2 is a perspective view of a divergent seal between two divergent flaps associated with the nozzle of FIG. 1.

FIG. 2 is an enlarged view of a portion of the nozzle 10 showing in greater detail a divergent seal 18 disposed between two adjacent divergent flaps 16. The divergent flaps 16 and the divergent seals 18 each define a plurality of cooling air inlet holes 24 at an upstream end, and each define a plurality of cooling air exit holes 26 defined at a downstream end.

Figure 3:
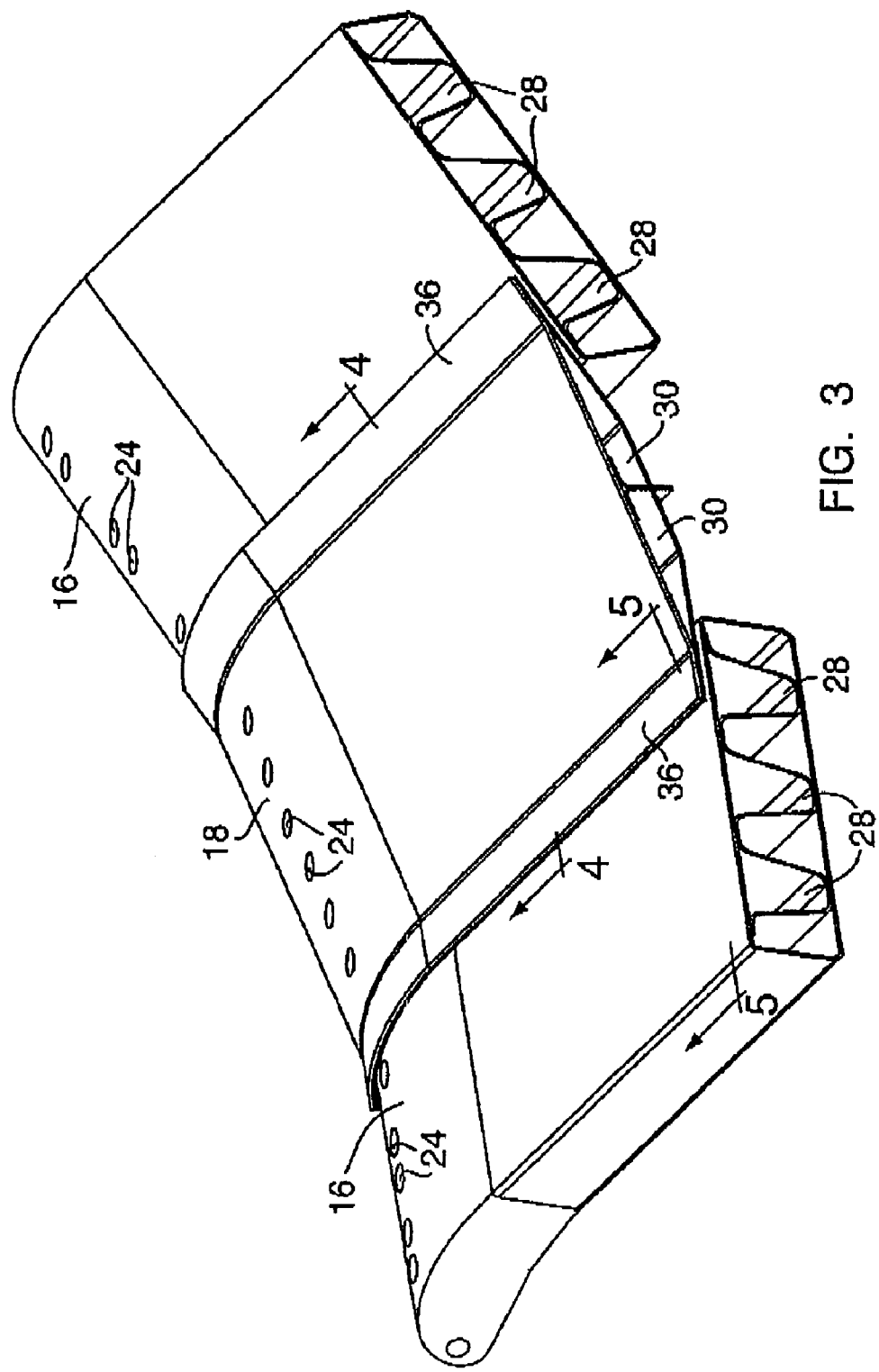
FIG. 3 is a cross-sectional perspective view of the divergent seal and flaps taken along the line 3-3 of FIG. 2.

As shown in FIG. 3, each of the divergent flaps 16 defines a plurality of inner channels 28, and each of the divergent seals 18 defines a plurality of inner channels 30. Each of the channels 28, 30 associated with the divergent flaps 16 and the divergent seals 18 communicates at a first end with a portion of the inlet holes 24 and communicates at a second end with a portion of the exit holes 26. A portion of cooling air discharge 32 from nozzle convergent liners 34 is diverted into the inlet holes 24, through the channels 28 of the divergent flaps 16 and the channels 30 of the divergent seals 18, and out of the exit holes 26 to more effectively cool the gas path surfaces of the divergent flaps and the divergent seals during engine augmentation.

Thus, the inlet holes 24 defined in the upstream end of the divergent flaps 16 and the divergent seals 18, and the exit holes 26 defined in the downstream end of the divergent flaps and the divergent seals provide a means for cooling air to be routed through the channels 28, 30 formed preferably by a sheet metal construction of these parts. The channels 28, 30 form a plenum in which the inlet and exit holes 24, 26 defined in hot sheets forming the divergent flaps 16 and the divergent seals 18 provide the discharge of cooling air to actively film and effusion cool the gas path surfaces. However, there is no plenum on lateral edge regions 36 of the divergent seal 18 as illustrated in FIG. 4. Accordingly, there is a need to keep these surfaces cooled.

With reference to FIG. 5, by using the channels 28 in the adjacent divergent flaps 16, cooling air is routed to effectively cool lateral edge regions 36 of the divergent seals 18. The divergent flaps 16 define cooling air exit holes 26 disposed adjacent to lateral edge regions 38 thereof. The lateral edge regions 36 of the divergent seals 18 each have an outer backside surface which is in overlying relationship with at least a portion of the cooling air exit holes 26 defined in an associated adjacent divergent flap 16 throughout the entire augmented range of motion of the nozzle 10. Once aligned with the lateral edge regions 36 of the divergent seals 18, the laterally disposed exit holes 26 of the divergent flaps 16 discharge cooling air to dilute hot gas leakage at a flap/seal interface and film cool the backside of the lateral edge regions 36 of the divergent seals 18.

As shown in FIG. 5, a flow of hot core gas 40 flows from an inside of the nozzle 10 to the outside thereof through a gap 42 between overlapping portions of a divergent flap 16 and a divergent seal 18. Specifically, the hot core gas 40 flows by an edge barrier zone 44 and a dilution zone 46. The edge barrier zone 44 is that portion of a divergent flap 16 wherein the exit holes 26 are not covered by and are disposed beyond a lateral edge of an adjacent divergent seal 18. The dilution zone 46 is that portion of a divergent flap 16 wherein the exit holes 26 are covered by a lateral edge region of an adjacent divergent seal 18. A portion of the cooling air flowing through the channels 28 of a divergent flap 16 flows out of the exit holes 26 located in the dilution zone 46 and disposed in overlapping relationship with a lateral edge region of an adjacent divergent seal 18 in order to cool the lateral edge region of the seal.

The advantages of the present invention over other methods of cooling the lateral edge regions of the seal are:

1. The cooling system and method in accordance with the present invention keeps the configuration of the divergent seal relatively simple by not requiring convective cooling air channels or other cooling mechanisms to be constructed in the assembly, minimizing both cost and weight of the nozzle.

2. The present cooling system and method optimizes nozzle performance by efficiently reducing the amount of cooling air necessary to cool the gas path surface area of the divergent flaps and seals. By routing cooling air through the flap in the manner proposed, the discharge of air serves the dual purpose of cooling both the gas path surface of the flap and the lateral edge regions of the seal. In addition, selective positioning of these holes ensures that the lateral edge regions of the seal are actively cooled only during augmented operation of the nozzle, thereby minimizing the amount of cooling air diverted to the divergent section of the nozzle during dry power operation.

3. In order to minimize the amount of cooling air for the entire range of flap-to-seal edge travel, a multi-zone edge cooling approach is implemented. The first zone has all axial flap cooling hole rows covered by the lateral edge region of a divergent seal so that all rows directly provide gap dilution air. The second zone has a portion of axial row of holes exposed to the core environment and a portion of axial row of holes covered by the lateral edge region of a divergent seal. The uncovered core exposed rows provide edge barrier film cooling. The covered seal edge axial rows continue to provide gap dilution air. The third zone has all axial rows uncovered by the lateral edge region of a divergent seal and all axial rows are exposed to the core conditions. These exposed axial rows produce enhanced edge barrier film cooling.

As will be recognized by those of ordinary skill in the pertinent art, numerous modifications and substitutions can be made to the above-described embodiment of the present invention without departing from the scope of the invention. Accordingly, the preceding portion of this specification is to be taken in an illustrative, as opposed to a limiting sense.

What is claimed is:

1. A system for cooling lateral edge regions of an exhaust nozzle divergent seal for a gas turbine engine, the system comprising an axisymmetric nozzle including:

a plurality of divergent flaps disposed about a central longitudinal axis of the nozzle, the divergent flaps each having an inner surface defining a plurality of cooling air inlet holes at an upstream portion, a plurality of cooling air exit holes at a downstream portion, and a plurality of cooling air channels disposed within the divergent flap and communicating at a first end with the inlet holes of the divergent flap and at a second end with the exit holes of the divergent flap for conducting cooling air therethrough, at least a portion of the exit holes of the divergent flap being disposed along lateral edge regions of the divergent flap; and a plurality of divergent seals disposed about the central longitudinal axis, the plurality of divergent seals being interposed between adjacent divergent flaps, the divergent seals each having an inner surface defining a plurality of cooling air inlet holes at an upstream portion, a plurality of cooling air exit holes at a downstream portion, and a plurality of cooling air channels disposed within the divergent seal and communicating at a first end with the inlet holes of the divergent seal and at a second end with the exit holes of the divergent seal for conducting cooling air therethrough, the plurality of divergent seals each including lateral edge regions extending laterally beyond the exit holes of the divergent seal, the lateral edge regions of each divergent seal having an outer surface being in overlying relationship with at least a portion of the exit holes defined in an associated adjacent divergent flap for cooling air to flow through said portion of the exit holes and thereby cool the lateral edge regions of the associated divergent seal.

2. A system as defined in claim 1, wherein the plurality of divergent flaps each define three air cooling channels.

3. A system as defined in claim 1, wherein the plurality of divergent seals each define two air cooling channels.

4. A system as defined in claim 1, wherein the plurality of divergent flaps each include sheet metal walls disposed therein for forming the cooling channels.

5. A system as defined in claim 1, wherein the plurality of divergent seals each include sheet metal walls disposed therein for forming the cooling channels.

6. A system as defined in claim 1, wherein the plurality of divergent flaps are each fabricated at least in part from sheet metal.

7. A system as defined in claim 1, wherein the plurality of divergent seals are each fabricated at least in part from sheet metal.

\* \* \* \* \*